(12) United States Patent
Nakayama (10) Patent No.: US 8,319,364 B2
(45) Date of Patent: Nov. 27, 2012

(54) STRESS ANALYSIS DEVICE FOR WIND-TURBINE STRUCTURE, COMPUTER-READABLE STORAGE MEDIUM STORING STRESS ANALYSIS PROGRAM, AND WIND TURBINE GENERATOR SYSTEM

(75) Inventor: Shin Nakayama, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 127 days.

(21) Appl. No.: 12/937,747

(22) PCT Filed: Sep. 24, 2009

(86) PCT No.: PCT/JP2009/066513
§ 371 (c)(1),
(2), (4) Date: Nov. 4, 2010

(87) PCT Pub. No.: WO2010/035742
PCT Pub. Date: Apr. 1, 2010

(65) Prior Publication Data
US 2011/0049888 A1    Mar. 3, 2011

(30) Foreign Application Priority Data
Sep. 26, 2008  (JP) .................................. 2008-248556

(51) Int. Cl.
*F03D 9/00* (2006.01)
(52) U.S. Cl. .......................................... 290/44; 290/55
(58) Field of Classification Search .................. 290/44, 290/55
See application file for complete search history.

(56) References Cited

U.S. PATENT DOCUMENTS

| | | | |
|---|---|---|---|
| 6,940,185 B2* | 9/2005 | Andersen et al. | 290/44 |
| 7,895,018 B2* | 2/2011 | Nies | 702/188 |
| 8,229,712 B2* | 7/2012 | Hirata | 703/1 |
| 2007/0182162 A1* | 8/2007 | McClintic | 290/55 |
| 2007/0297892 A1* | 12/2007 | Kildegaard | 415/1 |
| 2009/0058095 A1* | 3/2009 | McClintic | 290/55 |
| 2009/0169379 A1* | 7/2009 | McClintic | 416/31 |

FOREIGN PATENT DOCUMENTS

| | | |
|---|---|---|
| AU | 2003303228 | 8/2004 |
| DE | 197 31 918 | 1/1999 |
| JP | 2003-113769 | 4/2003 |
| JP | 2005-240785 | 9/2005 |
| JP | 2005-337267 | 12/2005 |
| JP | 2006-241981 | 9/2006 |
| WO | 2004/057113 | 7/2004 |

OTHER PUBLICATIONS

International Search Report dated Dec. 22, 2009 in corresponding International (PCT) Application No. PCT/JP2009/066513.
Decision to Grant a Patent issued Jul. 25, 2012 in corresponding Korean Patent Application No. 10-2010-7024014 (with partial English translation).
Chinese Office Action issued Aug. 1, 2012 in corresponding Chinese Patent Application No. 200980114956.1 with English translation.

* cited by examiner

*Primary Examiner* — Tho D Ta (57) ABSTRACT

Provided is a stress analysis device 3 for a wind-turbine structure, which includes a load-data generating section 21 that generates load time-series data of a predetermined load observation point, set in the wind-turbine structure, on the basis of a parameter related to an operating environment, and a stress analyzing section 22 that generates stress time-series data of at least one target analysis point, set in the wind-turbine structure, on the basis of the load time-series data.

5 Claims, 6 Drawing Sheets

STRESS ANALYSIS DEVICE FOR WIND-TURBINE STRUCTURE, COMPUTER-READABLE STORAGE MEDIUM STORING STRESS ANALYSIS PROGRAM, AND WIND TURBINE GENERATOR SYSTEM

TECHNICAL FIELD

The present invention relates to wind turbine generator systems that generate electricity by using wind turbines that convert natural wind energy into torque, and particularly, to a stress analysis device, for a wind-turbine structure, that analyzes the stress of the wind-turbine structure, as well as a computer-readable storage medium that stores a program therefor.

BACKGROUND ART

In the related art, wind turbine generator systems that generate electricity by utilizing wind force, which is natural energy, are known. In such a wind turbine generator system, a nacelle mounted on a tower is provided with a hub having blades attached thereto, a main shaft coupled to this hub so as to rotate together therewith, a gear box coupled to the main shaft that rotates in response to wind force received by the blades, and a generator driven by shaft output power of the gear box.

In such a wind turbine generator system, for example, the blade pitch angles are controlled in accordance with the wind conditions so that a predetermined rotation speed and predetermined power of the generator are obtained. Furthermore, for example, Patent Literature 1 discloses a technique for calculating the attack angle of wind blowing on each blade and the load acting on each part of the nacelle, and individually controlling the pitch angles of each of the blades so as to reduce fluctuations in this load.

{Citation List}
{Patent Literature}
{PTL 1} Japanese Unexamined Patent Application, Publication No. 2003-113769

SUMMARY OF INVENTION

{Technical Problem}

However, since operation control in the wind turbine generator system of the related art is performed without taking into account fatigue degradation of its structure caused by the load, if the actual system is operated under conditions that significantly differ from ideal conditions, there is a possibility that a failure due to degradation may occur at a point earlier than the life span originally set when the system was designed.

An object of the present invention is to provide a stress analysis device, for a wind-turbine structure, that allows for operation of a wind turbine generator system under a less-damaging, more-ideal environment and that also prevents failures from occurring due to fatigue degradation and the like caused by fluctuating load repeatedly applied to the system, a computer-readable storage medium that stores a stress analysis program, and a wind turbine generator system.

{Solution to Problem}

A first aspect of the present invention provides a stress analysis device, for a wind-turbine structure, that includes a load-data generating section that generates load time-series data of a predetermined load observation point, set in the wind-turbine structure, on the basis of a parameter related to an operating environment; and a stress analyzing section that generates stress time-series data of at least one target analysis point, set in the wind-turbine structure, on the basis of the load time-series data.

According to this aspect, the load time-series data of the predetermined load observation point set in the wind-turbine structure is generated by the load-data generating section, and the stress time-series data of at least one target analysis point set in the wind-turbine structure is calculated by the stress analyzing section on the basis of this load time-series data. Therefore, by reflecting this stress time-series data on operation control of a wind turbine generator system, the wind turbine generator system can be operated under more-ideal environment, and failures due to fatigue degradation and the like caused by fluctuating load repeatedly applied to the system can be prevented from occurring.

The parameter related to the operating environment includes, for example, the wind speed, the wind direction, and the load, and includes at least a parameter required for obtaining the load. Furthermore, the parameter related to the operating environment may be load data itself measured by a load sensor.

The load observation point and the target analysis point can be set in the wind-turbine structure in a freely chosen manner. For example, the load observation point is preferably set where the parameter related to the operating environment is measured. The target analysis point is preferably set at multiple positions throughout the wind-turbine structure so as to allow for detailed stress analysis of the wind turbine.

In the aforementioned stress analysis device for a wind-turbine structure, the load-data generating section may use a load conversion table corresponding to the target analysis point so as to generate load time-series data of each basic component at the target analysis point from the load time-series data of the load observation point. The stress analyzing section may obtain stress time-series data of each basic component acting on the target analysis point on the basis of the load time-series data of the basic component and a structural response of the basic component when a unit load is acting on the target analysis point, obtain first principal-stress time-series data indicating a stress value in a principal-stress direction at each time point from the stress time-series data of each basic component, designate the principal-stress direction at a time point corresponding to maximum principal stress in the first principal-stress time-series data as a designated direction, and generate second stress time-series data indicating a stress value in the designated direction at each time point from the stress time-series data of each basic component.

According to this configuration, the load time-series data of each basic component at the target analysis point is generated, and the load time-series data of the basic components are combined, thereby generating the first principal-stress time-series data in the principal-stress direction. Generating the first principal-stress time-series data in this manner allows for confirmation of the stress value acting on the target analysis point at each time point. Then, the time point corresponding to the maximum stress value in the first principal-stress time-series data is identified, and the principal-stress direction at this time is designated as the designated direction. Subsequently, stress time-series data in the designated direction is generated from the stress time-series data of each basic component and is used as the second stress time-series data. Since the direction in which the maximum stress is applied is designated as the designated direction, and stress time-series data in the designated direction is re-obtained, the fluctuation state of stress acting in a direction in which maximum force is applied, that is, a direction in which fatigue damage, such as crack extension, tends to occur easily, can be reliably ascertained.

The basic components are, for example, three components, which are x-axis, y-axis, and z-axis components. If a direction in which damage tends to occur easily, such as a direction in which a crack tends to form easily, depending on the target analysis point is known in advance, the aforementioned first principal-stress time-series data and the aforementioned second stress time-series data may be generated not by using all of the aforementioned three components but by only using the load time-series data of the component relevant to that direction.

In the aforementioned stress analysis device for a wind-turbine structure, the stress analyzing section may obtain cumulative stress from the second stress time-series data of each target analysis point and determine whether or not the cumulative stress exceeds a preset degradation reference value, and may include a notifying section that provides a notification if any target analysis point with the cumulative stress exceeding the degradation reference value exists.

According to this configuration, if the cumulative stress exceeds the degradation reference value, a notification of the situation is provided accordingly so that, by taking measures, such as stopping the operation control of the wind turbine generator system, in response to the notification, failures can be prevented from occurring.

A second aspect of the present invention provides a wind turbine generator system that includes the aforementioned stress analysis device for a wind-turbine structure, and an operation control device. The stress analysis device feeds back the stress information to the operation control device, and the operation control device performs operation control on the basis of stress information.

According to this aspect, the information related to the stress analyzed by the stress analysis device is reflected on the operation control of the wind turbine generator system, whereby the wind turbine generator system can be operated under a less-damaging, more-ideal environment, and failures due to fatigue degradation and the like caused by fluctuating load repeatedly applied to the system can be prevented from occurring.

A third aspect of the present invention provides a computer-readable storage medium that stores a stress analysis program for a wind-turbine structure, the stress analysis program making a computer execute load-data generation processing for generating load time-series data of a predetermined load observation point, set in the wind-turbine structure, on the basis of a parameter related to an operating environment; and stress analysis processing for generating stress time-series data of at least one target analysis point, set in the wind-turbine structure, on the basis of the load time-series data.

ADVANTAGEOUS EFFECTS OF INVENTION

The present invention advantageously allows for operation of a wind turbine generator system under a less-damaging, more-ideal environment and also prevents failures from occurring due to fatigue degradation and the like caused by fluctuating load repeatedly applied to the system.

DESCRIPTION OF EMBODIMENTS

An embodiment of a stress analysis device for a wind-turbine structure, a computer-readable storage medium that stores a stress analysis program, and a wind turbine generator system according to the present invention will be described below with reference to the drawings.

Figure 1:
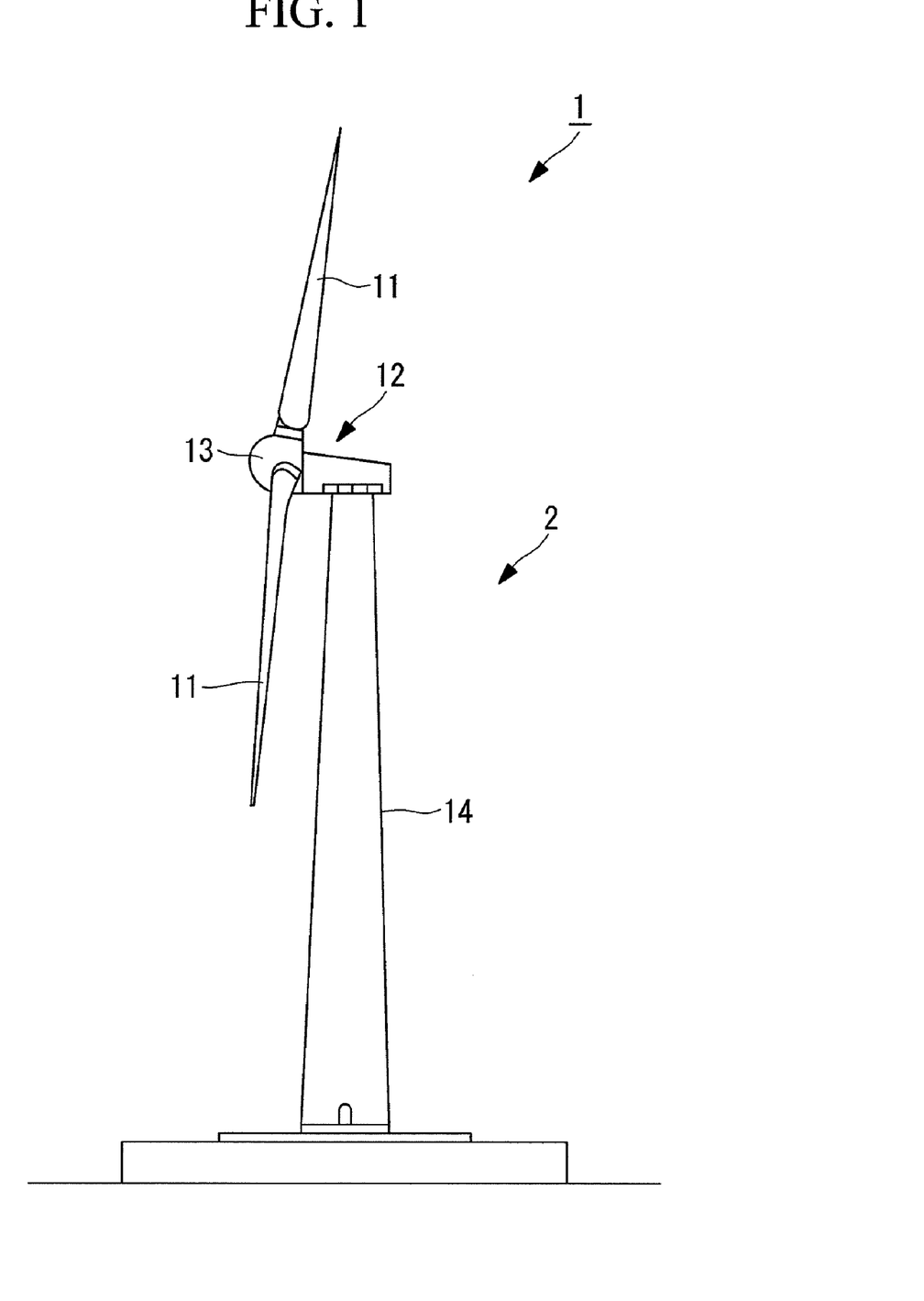
FIG. 1 is a diagram illustrating the schematic configuration of a wind turbine generator system according to an embodiment of the present invention.

FIG. 1 is a block diagram illustrating the schematic configuration of the wind turbine generator system according to this embodiment.

As shown in FIG. 1, a wind turbine generator system 1 includes a wind-turbine structure 2 having three blades 11, a nacelle 12, a hub 13 that attaches the three blades 11 to the nacelle 12, and a tower 14 that supports the nacelle 12. Although this embodiment is directed to an example where three blades are provided, the number of blades is not particularly limited.

In the wind-turbine structure 2, target analysis points, the stress on which is to be calculated by a stress analysis device to be described later, are preliminarily set. These target analysis points can be set freely at multiple positions throughout the wind-turbine structure 2, but are preferably set at, for example, positions where degradation tends to occur due to load. Specifically, the target analysis points are set at structural parts, such as the blades, the nacelle, and the tower, and at load transmission parts, such as a drive shaft.

Figure 2:
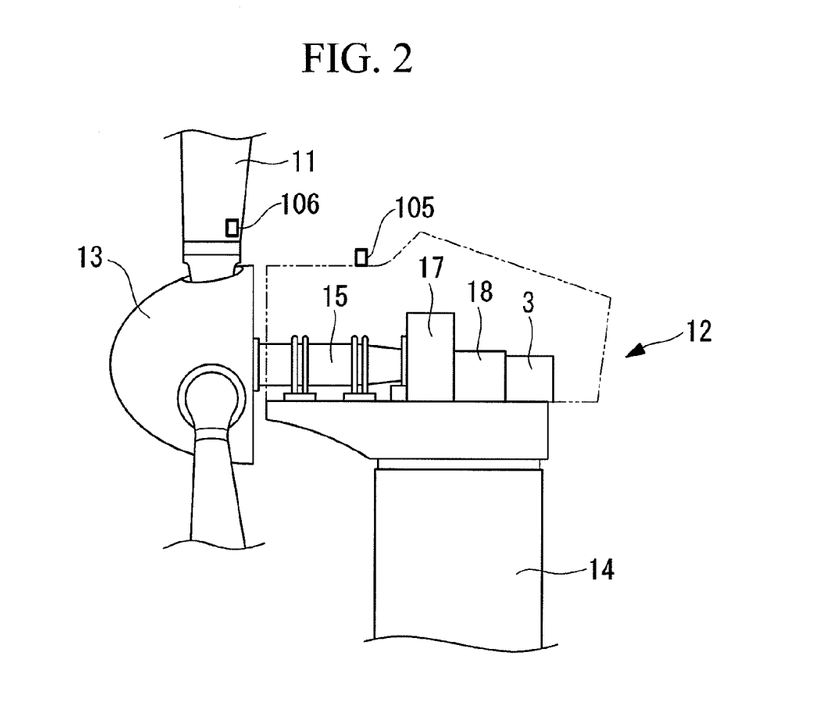
FIG. 2 is a diagram illustrating the schematic configuration of a nacelle and its surrounding area in FIG. 1.

As shown in FIG. 2, an anemoscope/anemometer 105 that measures the wind direction and the wind speed is provided on the top of the nacelle 12. Each of the blades 11 is provided with a pitch-angle sensor 106 for detecting the pitch angle. The nacelle 12 accommodates a main shaft 15 coupled to the hub 13 so as to rotate together therewith, a gear box (not shown) coupled to the main shaft 15, a generator 17 driven by shaft output power of the gear box, an operation control device 18 that controls the output power of the generator 17 and controls the pitch angles of the blades 11, a stress analysis device 3 that analyzes the stress acting on the multiple target analysis points set in the wind-turbine structure 2, and the like. The operation control device 18 receives measurement data obtained by the anemoscope/anemometer 105 and the pitch-angle sensors 106.

Although the stress analysis device 3 is accommodated in the nacelle 12 in this embodiment, the stress analysis device 3 may alternatively be set outside the wind-turbine structure 2 and be connected to various sensors and the operation control device 18 via a wireless or wired information transmission medium so as to be capable of sending and receiving information.

The stress analysis device 3 and the operation control device 18 each include, for example, a computer system having a CPU (central processing unit), a computer-readable storage medium such as a ROM (read-only memory), and a RAM (random access memory). The storage medium of the stress analysis device 3 stores, for example, a stress analysis program for the wind-turbine structure 2. A series of processes to be described later are achieved by the CPU loading the stress analysis program into the RAM or the like and executing information processing and arithmetic processing.

Figure 3:
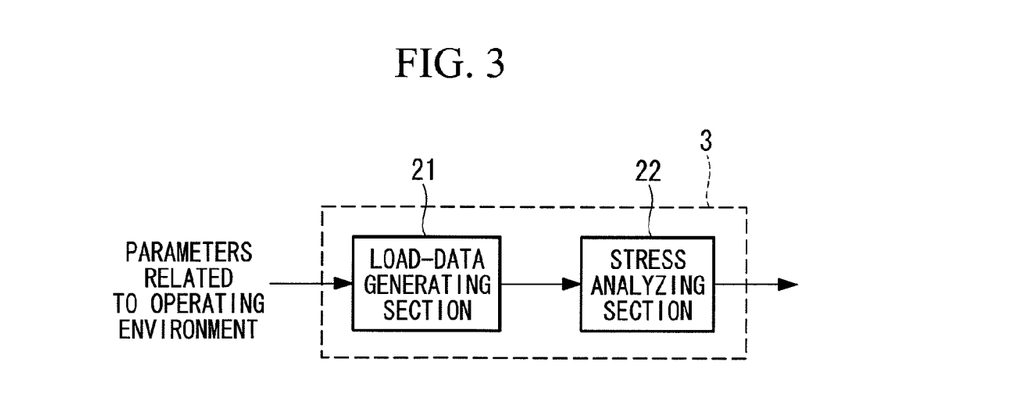
FIG. 3 is a functional block diagram illustrating, in expanded form, the function of a stress analysis device according to an embodiment of the present invention.

FIG. 3 is a functional block diagram illustrating, in expanded form, the function of the stress analysis device 3. As shown in this figure, the stress analysis device 3 includes a load-data generating section 21 that generates load time-series data of a predetermined load observation point, set in the wind-turbine structure 2, on the basis of parameters related to the operating environment, and a stress analyzing section 22 that generates stress time-series data of the multiple target analysis points, set in the wind-turbine structure 2, on the basis of the load time-series data.

The parameters related to the operating environment include, for example, the wind-direction deviation, the wind speed, the speed of rotation, and the output power. Regarding the wind direction and the wind speed, the measurement values of the anemoscope/anemometer 105 can be used, and the wind-direction deviation can be obtained by calculating it from the measurement data of the anemoscope/anemometer 105 and the yaw angle. The speed of rotation can be obtained from, for example, an output of an encoder or the like attached to near a rotor of the generator 17.

The load can be calculated from, for example, parameters, such as the wind direction, the wind speed, and the output power. For example, the parameters to be used for measuring the load and the parameters related to the operating environment are handled independently.

Figure 4A:
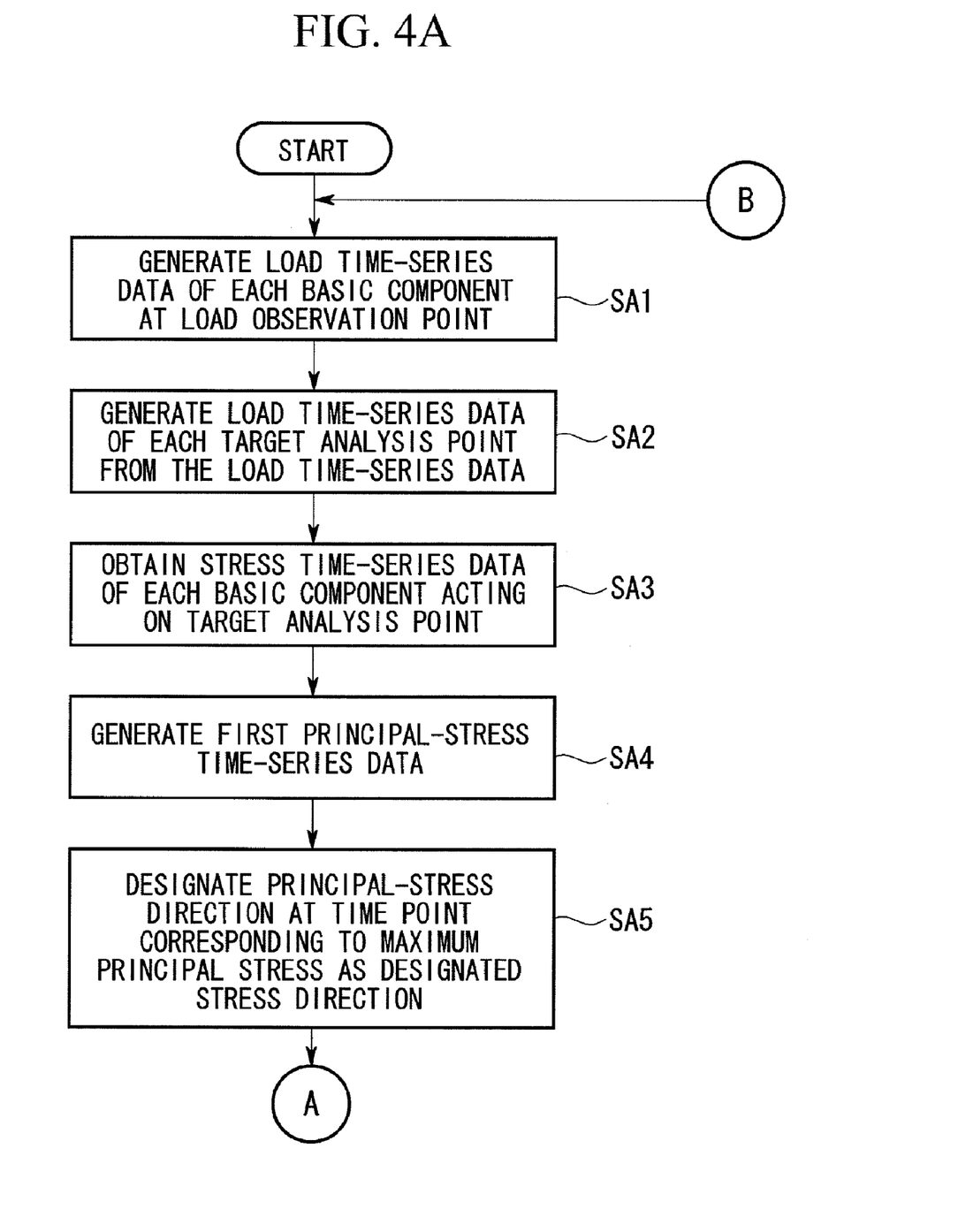
FIG. 4A is a flow chart illustrating a processing procedure executed by the stress analysis device according to the embodiment of the present invention.
Figure 5:
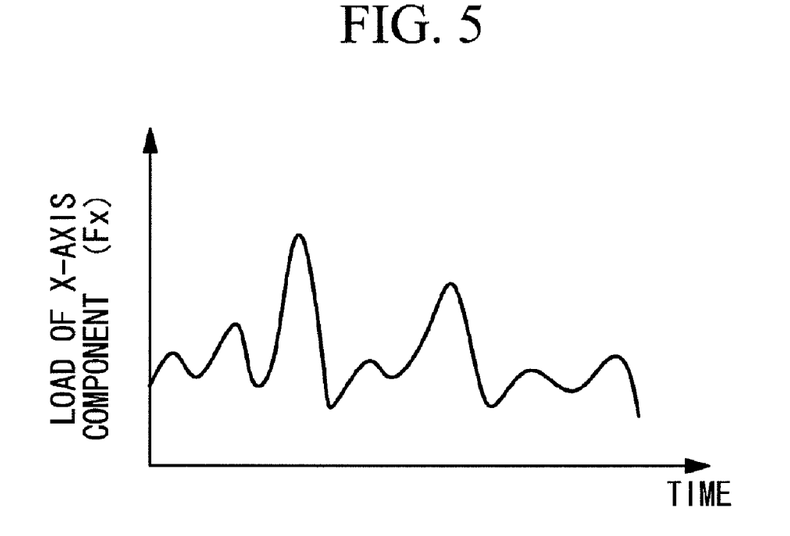
FIG. 5 is a diagram illustrating an example of load time-series data with respect to an x-axis direction at a load observation point.

The load-data generating section 21 calculates the load that corresponds to the predetermined load observation point, set in at least one area of the wind-turbine structure 2, for each of basic components (moment load and axial load in the three axial directions, i.e., x, y, and z axes) at each time point, and generates load time-series data of each basic component (step SA1 in FIG. 4A). Furthermore, these results are organized by using the parameters related to the operating environment mentioned above. FIG. 5 illustrates an example of load time-series data with respect to the x-axis direction at the load observation point. As shown in FIG. 5, regarding the load time-series data, the abscissa denotes time, whereas the ordinate denotes load. The load observation point refers to, for example, a place where a sensor that measures the parameters related to the operating environment is set, such as the place where the anemoscope/anemometer 105 is set.

Next, the load-data generating section 21, which preliminarily holds a load conversion table for each target analysis point, uses this load conversion table to generate load time-series data of the corresponding target analysis point on the basis of the load time-series data of the basic components (i.e., three components in the x-axis, y-axis, and z-axis directions) at the aforementioned load observation point (step SA2 in FIG. 4A).

The load conversion tables are conversion tables for obtaining load time-series data of the respective target analysis points from the load time-series data of the load observation point, and are generated by, for example, actually measuring the load at the load observation point and the target analysis points under a predetermined condition and then comparing these measurement results. Since the conversion tables are provided in this manner, load time-series data of the multiple target analysis points can be readily estimated from the load time-series data of the load observation point.

After the load time-series data of each target analysis point is generated for each basic component, the stress analyzing section 22 subsequently analyzes the stress at the target analysis point on the basis of this load time-series data. Specifically, the stress analyzing section 22 performs the following processing for each target analysis point set in the wind-turbine structure 2.

First, stress time-series data of each basic component acting on the aforementioned target analysis point is obtained on the basis of the load time-series data of the basic component and a structural response of the basic component when a unit load is acting on the target analysis point (step SA3 in FIG. 4A).

Figure 6:
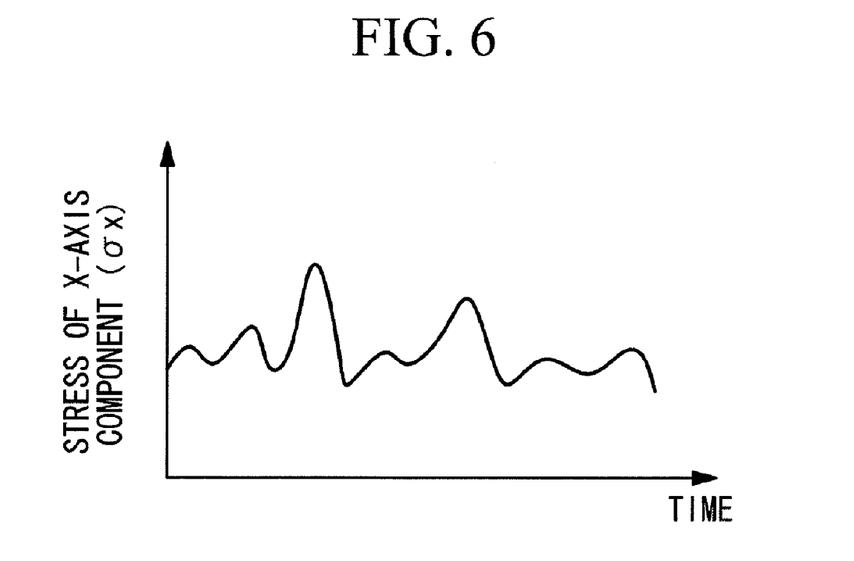
FIG. 6 is a diagram illustrating an example of stress time-series data of an x-axis component.

FIG. 6 illustrates an example of stress time-series data of an x-axis component. As shown in FIG. 6, regarding the stress time-series data, the abscissa denotes time, whereas the ordinate denotes stress.

Figure 7:
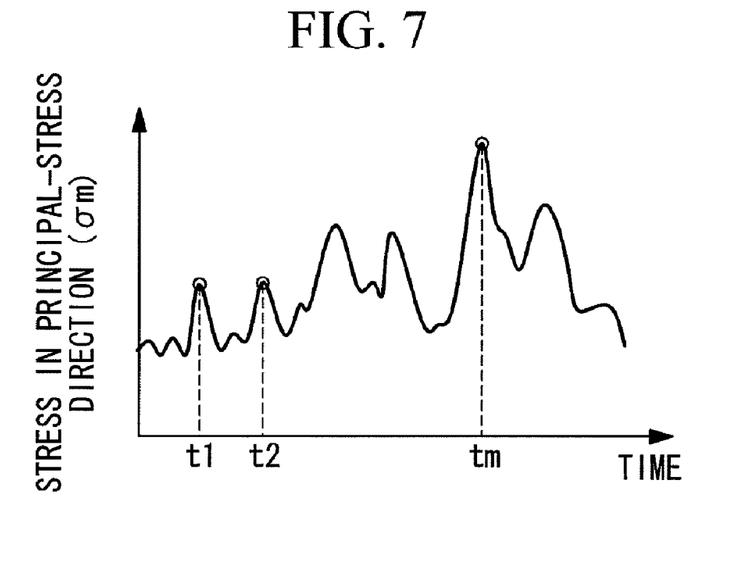
FIG. 7 is a diagram illustrating an example of first principal-stress time-series data.

Subsequently, first principal-stress time-series data indicating stress values in the principal-stress direction at respective time points is generated from the stress time-series data of each basic component (step SA4 in FIG. 4A). This can be calculated from the stress time-series data of each basic component. The reason that the first principal-stress time-series data is generated in this manner is because it is difficult to estimate the fatigue strength and the like at each target analysis point from the stress time-series data of each basic component. FIG. 7 illustrates an example of the first principal-stress time-series data. In FIG. 7, the abscissa denotes time, whereas the ordinate denotes a stress value in the principal-stress direction.

Subsequently, a time point tm corresponding to the maximum principal stress is identified in the first principal-stress time-series data, and the principal-stress direction at this time point tm is designated as a designated stress direction (step SA5 in FIG. 4A).

Figure 8:
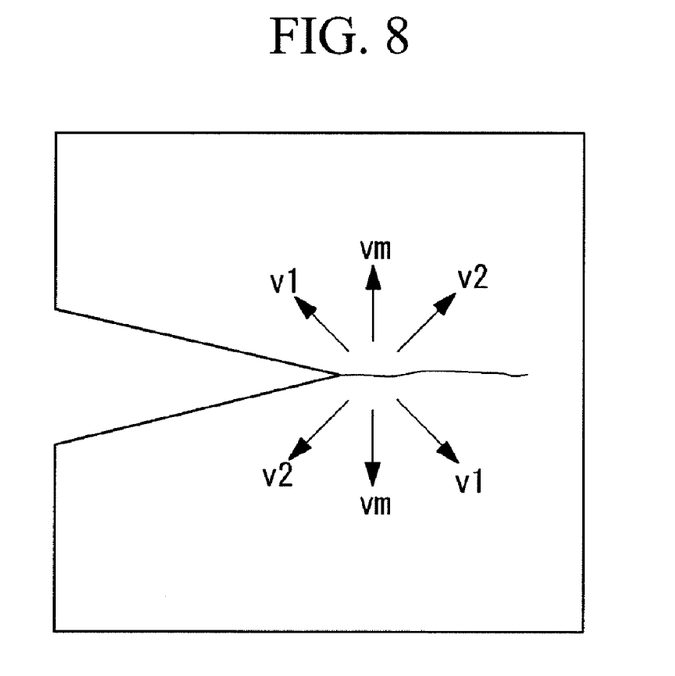
FIG. 8 is a diagram illustrating an example of principal-stress directions at respective time points.

In detail, as shown in FIG. 8, in the first principal-stress time-series data, the principal-stress direction varies between time points t1, t2, and tm. For example, the principal-stress direction at the time point t1 is v1, the principal-stress direction at the time point t2 is v2, and the principal-stress direction at the time point tm is vm; the principal-stress direction changes in accordance with the stress time-series data of each basic component at each time point. Therefore, in this processing, of the principal-stress direction that changes from moment to moment, the principal-stress direction at the time point corresponding to the maximum principal stress is designated as the designated stress direction or is converted to a preset directional component.

Subsequently, second stress time-series data in the designated stress direction is generated on the basis of the stress time-series data of each basic component (step SA6 in FIG. 4B). Since the designated stress direction is a direction corresponding to the maximum stress or a pre-designated direction, by generating the second stress time-series data, which is stress time-series data in this designated stress direction, the stress acting in the direction of force that is the most dominant for fatigue degradation of the target analysis point can be obtained.

Subsequently, cumulative stress is calculated by accumulating the stress values at the respective time points from the second stress time-series data (step SA7 in FIG. 4B). This cumulative stress and the aforementioned second stress time-series data are output to the operation control device 18 (step SA8 in FIG. 4B). Thus, the operation control device 18 can reflect the stress on operation control. For example, if the cumulative stress in a predetermined past time period is a value higher than a preset reference value, the operation control device 18 performs operation control to change each blade pitch angle in a direction that reduces the stress.

Subsequently, the stress analyzing section 22 determines whether or not the cumulative stress obtained from the second stress time-series data exceeds a preset degradation reference value (step SA9 in FIG. 4B). This degradation reference value is a value freely set for each target analysis point and is set to be smaller than a value at which a failure or a crack is assumed to occur at the target analysis point.

Figure 4B:
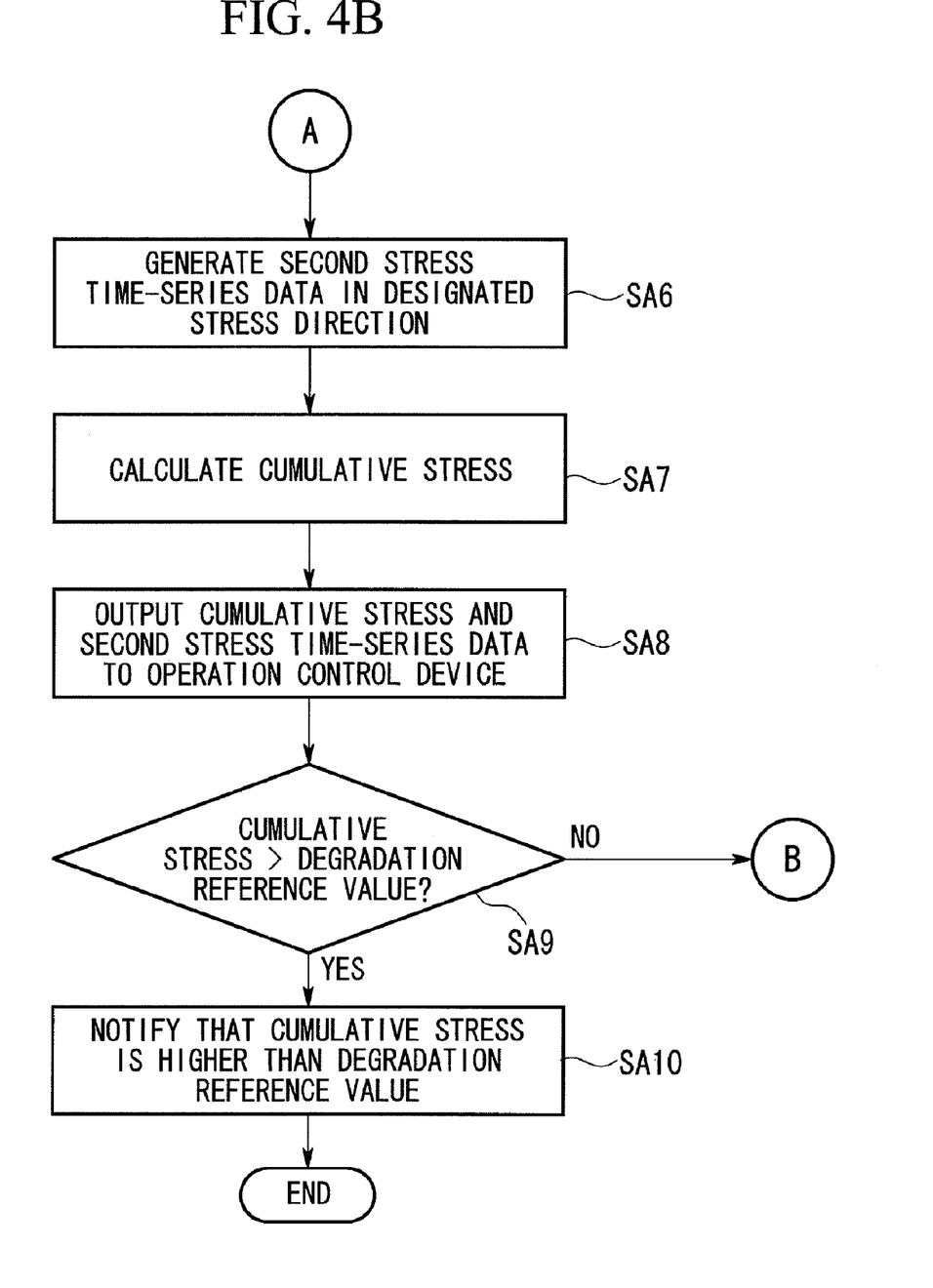
FIG. 4B is another flow chart illustrating the processing procedure executed by the stress analysis device according to the embodiment of the present invention.

If there are target analysis points with cumulative stress exceeding the degradation reference value, a notification of the situation is provided accordingly (step SA10 in FIG. 4B). For example, an operator or the like is notified of the situation by various methods, such as turning on an emergency lamp or displaying the notification on a display device set in a control room of a wind turbine generator system installed at a remote location, and a signal indicating the situation is output to the operation control device 18. Thus, in the operation control device 18, emergency measures are taken, such as stopping the operation. Consequently, failures in the wind-turbine structure due to degradation over time can be prevented from occurring.

As described above, with the stress analysis device for the wind-turbine structure, the computer-readable storage medium that stores the stress analysis program, and the wind turbine generator system according to this embodiment, information related to stress analyzed by the stress analysis device 3 for the wind-turbine structure is reflected on operation control (mainly including control of blade pitch angles and control of the generator), thereby allowing for operation under a less-damaging, more-ideal environment and also preventing failures from occurring due to fatigue degradation and the like caused by fluctuating load repeatedly applied to the system.

As an alternative to the above-described embodiment in which load is calculated on the basis of the parameters related to the operating environment, such as the wind direction, the wind speed, the wind-direction deviation, and the speed of rotation, a load sensor may be provided at the load observation point so that load time-series data of each basic component at the load observation point can be directly generated by using a measurement value of the load sensor in its original form. Attaching the load sensor in this manner can allow for reduction of processing load as well as a shorter processing time.

Although the embodiment of the present invention has been described in detail above with reference to the drawings, specific configurations are not to be limited to this embodiment, and the present invention includes design modifications so long as they do not depart from the spirit of the invention.

REFERENCE SIGNS LIST 1 wind turbine generator system
2 wind-turbine structure
3 stress analysis device
11 blade
12 nacelle
13 hub
15 main shaft
17 generator
18 operation control device
21 load-data generating section
22 stress analyzing section
105 anemoscope/anemometer
106 pitch-angle sensor

The invention claimed is:

1. A stress analysis device for a wind-turbine structure, comprising:
 a load-data generating section that generates load time-series data of a predetermined load observation point, set in the wind-turbine structure, on the basis of a parameter related to an operating environment; and
 a stress analyzing section that generates stress time-series data of at least one target analysis point, set in the wind-turbine structure, on the basis of the load time-series data,
 wherein the load-data generating section uses a load conversion table corresponding to the target analysis point so as to generate load time-series data to each basic component at the target analysis point from the load time-series data of the load observation point, and
 wherein the stress analyzing section performs
 obtaining stress time-series data of each basic component acting on the target analysis point on the basis of the load time-series data of the basic component and a structural response of the basic component when a unit load is acting on the target analysis point,
 obtaining first principal-stress time-series data indicating a stress value in a principal-stress direction at each time point from the stress time-series data of each basic component,
 designating the principal-stress direction at a time point corresponding to maximum principal stress in the first principal-stress time-series data as a designated direction, and
 generating second stress time-series data indicating a stress value in the designated direction at each time point from the stress time-series data of each basic component.

2. A wind turbine generator system comprising:
 the stress analysis device for a wind-turbine structure according to claim 1; and
 an operation control device,
 wherein the stress analysis device feeds back the stress information to the operation control device, and
 wherein the operation control device performs operation control on the basis of stress information.

3. The stress analysis device for a wind-turbine structure according to claim 1, wherein the stress analyzing section obtains cumulative stress from the second stress time-series data of each target analysis point and determines whether or not the cumulative stress exceeds a preset degradation reference value, and includes a notifying section that provides a notification if any target analysis point with the cumulative stress exceeding the degradation reference value exists.

4. A wind turbine generator system comprising:
 the stress analysis device for the wind-turbine structure according to claim 3; and
 an operation control device,
 wherein the stress analysis device feeds back the stress information to the operation control device, and
 wherein the operation control device performs operation control on the basis of stress information.

5. A stress analysis program for a wind-turbine structure to make a computer execute:
 load-data generation processing for generating load time-series data of a predetermined load observation point, set in the wind-turbine structure, on the basis of a parameter related to an operating environment; and stress analysis processing for generating stress time-series data of at least one target analysis point, set in the wind-turbine structure, on the basis of the load time-series data, wherein the load-data generating section uses a load conversion table corresponding to the target analysis point so as to generate load time-series data of each basic component at the target analysis point from the load time-series data of the load observation point, wherein the load-data generation section includes a step of generating load time-series data of each basic component at the target analysis point from the load time-series data of the load observation point by using a load conversion table corresponding to the target analysis point, and wherein the stress analysis processing includes a step of obtaining stress time-series data of each basic component acting on the target analysis point on the basis of the load time-series data of the basic component and a structural response of the basic component when a unit load is acting on the target analysis point, a step of obtaining first principal-stress time-series data indicating a stress value in a principal-stress direction at each time point from the stress time-series data of each basic component, a step of designating the principal-stress direction at a time point corresponding to maximum principal stress in the first principal-stress time-series data as a designated direction, and a step of generating second stress time-series data indicating a stress value in the designated direction at each time point from the stress time-series data of each basic component.

* * * * *